Figure 1:
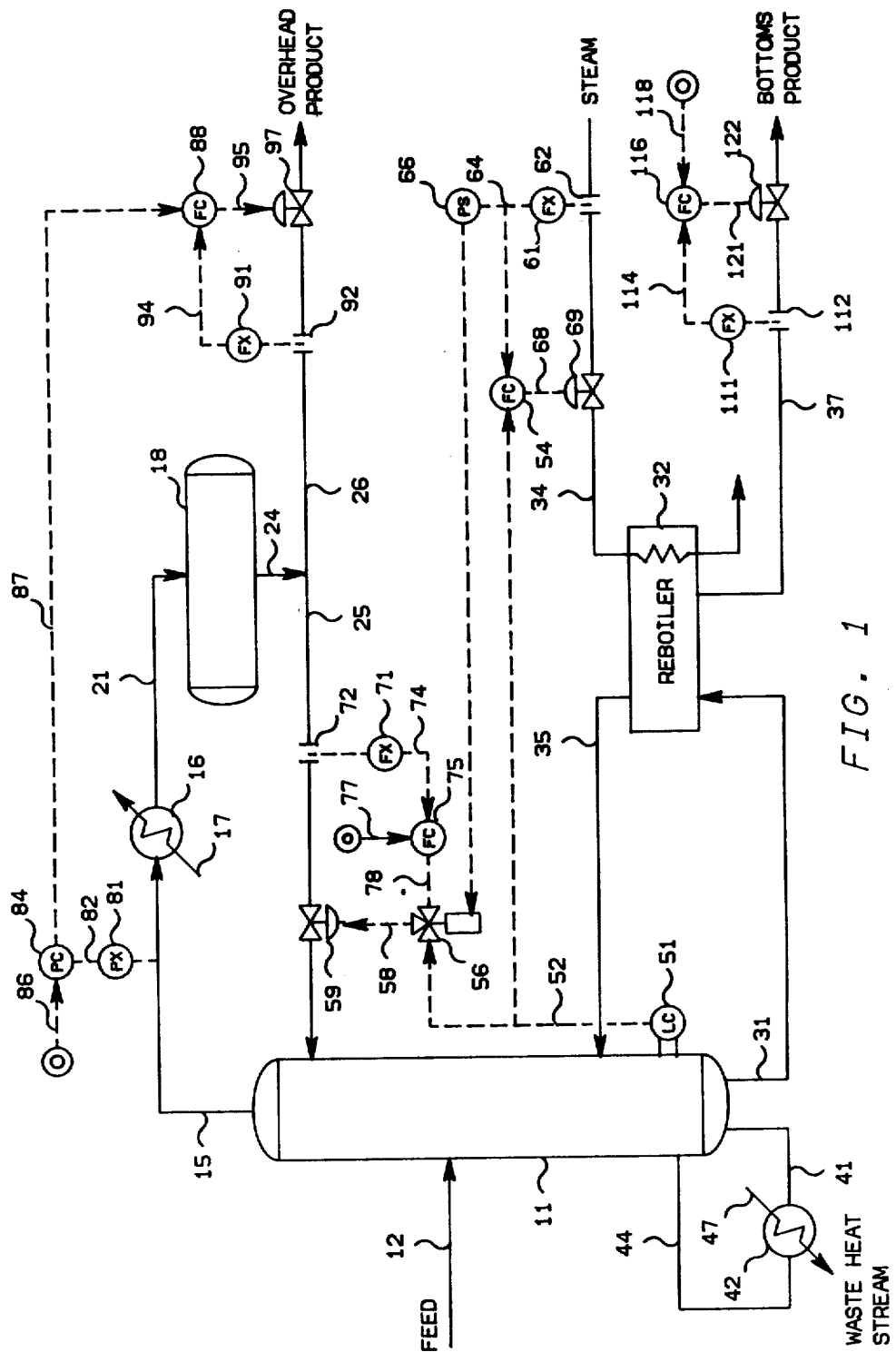

United States Patent [19]

Tuck et al.

[11] 4,377,443
[45] Mar. 22, 1983

[54] CONTROL OF A FRACTIONAL DISTILLATION PROCESS

[75] Inventors: Lee Tuck, Lake Jackson; Frank W. Skraba, Sweeny, both of Tex.

[73] Assignee: Phillips Petroleum Company, Bartlesville, Okla.

[21] Appl. No.: 365,202

[22] Filed: Apr. 5, 1982

[51] Int. Cl.³ .............................................. B01D 3/42
[52] U.S. Cl. .............................................. 203/1; 203/2; 203/100; 203/DIG. 8; 203/DIG. 9; 202/160; 202/206
[58] Field of Search ........................... 203/1-3, 203/DIG. 8, DIG. 9, DIG. 18, 100; 202/160, 206; 196/132; 208/DIG. 1; 62/21, 37; 364/501

[56] References Cited

U.S. PATENT DOCUMENTS

| | | | |
|---|---|---|---|
| 2,976,234 | 3/1961 | Webber | 203/1 |
| 3,309,288 | 3/1967 | Butterbaugh | 203/1 |
| 3,322,136 | 5/1967 | Matta | 137/118 |
| 3,340,158 | 9/1967 | Bates | 203/2 |
| 3,434,934 | 3/1969 | Washer | 203/2 |
| 3,555,837 | 1/1971 | McClintock | 62/17 |
| 3,660,247 | 5/1972 | Franks et al. | 203/1 |
| 3,668,078 | 6/1972 | Holland | 203/3 |
| 3,803,002 | 4/1974 | Skraba et al. | 203/1 |
| 3,905,874 | 9/1975 | Griffin et al. | 203/1 |
| 4,019,964 | 4/1977 | Fickel | 203/DIG. 9 |

*Primary Examiner*—Wilbur L. Bascomb, Jr.

[57] ABSTRACT

In a fractional distillation process in which a heating fluid and waste heat stream are utilized to supply heat to a fractional distillation column and in which the heat supplied from the waste heat stream is not controllable, control of the liquid level in the fractional distillation column is accomplished by manipulating the flow rate of the heating fluid so as to maintain a desired liquid level until such time as the flow rate of the heating fluid becomes zero at which time the flow rate of the external reflux to the fractional distillation column is manipulated to maintain a desired liquid level in the fractional distillation column. A switching of control of the liquid level provides a means by which an uncontrollable heat input may be provided to the fractional distillation column without losing control of the liquid level in the fractional distillation column.

10 Claims, 1 Drawing Figure

CONTROL OF A FRACTIONAL DISTILLATION PROCESS

This invention relates to control of a fractional distillation process having an uncontrollable heat input. In one aspect, this invention relates to method and apparatus for maintaining a desired liquid level in a fractional distillation process having an uncontrollable heat input.

Fractional distillation columns are employed in many chemical manufacturing processes to make desired separations. Typically, a feed stream containing at least first and second components is supplied to the fractional distillation column. A substantial portion of the first component contained in the feed stream is removed from the fractional distillation column as an overhead product and a substantial portion of the second component is removed from the fractional distillation process as a bottoms product. Heat is generally supplied to the fractional distillation column in order to affect the desired separation.

Heat is typically supplied to a fractional distillation column by either recycling a portion of the bottoms product through a reboiler to which a heating fluid such as steam is passed or by passing the heating fluid directly through the liquid in the fractional distillation column. However, as the cost of energy have increased, it is becoming more and more important to minimize the use of the heating fluid so as to maintain the economic viability of the distillation process.

One method for minimizing the use of a heating fluid such as steam is to recover waste heat from process streams associated with other processes in a chemical manufacturing complex. Since any particular chemical manufacturing process will typically employ a number of distillation columns and other process equipment, streams from these associated distillation columns or other process equipment, the heat in which would normally not be utilized, can be passed through a heat exchanger through which liquid from the bottom of the fractional distillation column is passed or can be passed through the liquid in the fractional distillation column to supply heat to the fractional distillation column. In some cases, this can even result in improved economics for the process with which the waste heat supplying stream is associated since it may be necessary to cool the waste heat supplying stream.

As used herein, the term "heating fluid" will be used to refer to a fluid such as steam which is supplied to a reboiler or circulated through the liquid in the fractional distillation column. The term "waste heat stream" will be used to refer to the fluid stream which is used to supply waste heat to the fractional distillation column.

In a fractional distillation process, it is important to maintain a desired liquid level in the fractional distillation column in order to maintain a desired operation of the fractional distillation process and prevent flooding of the column. The liquid level in the fractional distillation column may be maintained at a desired level by manipulating the heat supplied to the fractional distillation column. However, when a waste heat stream is being utilized to supply heat to the fractional distillation column, this waste heat stream will represent an uncontrollable heat input to the fractional distillation column. It is generally not even possible to measure the flow of fluid returning to the fractional distillation column from the waste heat exchanger since the flow of this fluid will generally be two phase. Thus, when a waste heat stream is being utilized to supply heat to a fractional distillation column, it may no longer be possible to control the flow rate of the heating fluid to the fractional distillation column so as to maintain a desired liquid level in the fractional distillation column since this flow rate may be zero if sufficient heat can be supplied by the waste heat stream.

It is thus an object of this invention to provide method and apparatus for maintaining a desired liquid level in a fractional distillation process having an uncontrollable heat input.

In accordance with the present invention, control of the liquid level in a fractional distillation process in which a heating fluid and waste heat stream are utilized to supply heat to the fractional distillation column is accomplished by manipulating the flow rate of the heating fluid so as to maintain a desired liquid level until such time as the flow rate of the heating fluid becomes zero at which time the flow rate of the external reflux to the fractional distillation column is manipulated to maintain a desired liquid level in the fractional distillation column. This switching of control of the liquid level provides a means by which an uncontrollable heat input may be provided to the fractional distillation column without losing control of the liquid level in the fractional distillation column.

Other objects and advantages of the invention will be apparent from the foregoing brief description of the invention and the claims as well as the detailed description of the drawing which is briefly described as follows:

FIG. 1 is a diagramatic illustration of a fractional distillation process which has an uncontrollable heat input and the associated control system of the present invention.

The invention is illustrated and described in terms of a specific fractional distillation process in which only an overhead product and bottoms product are withdrawn from the fractional distillation column with the flow rate of the overhead product being manipulated to maintain a desired pressure for the overhead vapor stream and the flow rate of the bottoms product being manipulated to maintain a desired flow rate set by an operator. However, the invention is applicable to any fractional distillation process in which it is desired to utilize an uncontrollable heat input.

Also, the invention is illustrated and described in terms of a fractional distillation process in which the heating fluid is supplied to a reboiler and the waste heat stream is supplied to a waste heat exchanger. As has been previously stated, either of these streams could be circulated through the liquid in the bottom of the fractional distillation column if desired. As used herein, the term "reboiler" refers to the heat exchanger to which the heating fluid is supplied while the term "waste heat exchanger" refers to the heat exchanger to which the waste heat stream is supplied.

A specific control system configuration is set forth in FIG. 1 for the sake of illustration. However, the invention extends to different types of control system configurations which accomplish the purpose of the invention. Lines designated as signal lines in the drawings are pneumatic in this preferred embodiment. However, the invention is also applicable to electrical, mechanical, hydraulic or other signal means for transmitting information. In almost all control systems electrical, pneumatic, mechanical or hydraulic signals or some combination thereof will be used. However, use of any other type of signal transmission, compatible with the process and equipment in use, is within the scope of the invention.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 1, there is illustrated a fractional distillation column 11. A feed stream containing at least two components to be separated is provided to the fractional distillation column 11 through conduit means 12. An overhead vapor stream is removed from the fractional distillation column 11 through conduit means 15. The overhead vapor stream flowing through conduit means 15 is provided from the fractional distillation column 11 through conduit means 15 to the heat exchanger 16. The heat exchanger 16 is provided with a cooling medium through conduit means 17. The at least partially condensed fluid stream from the heat exchanger 16 is provided to the overhead accumulator 18 through conduit means 21. A first portion of the liquid in the overhead accumulator 18 is provided through the combination of conduit means 24 and 25 as an external reflux to the fractional distillation column 11. A second portion of the liquid in the accumulator 18 is removed through the combination of conduit means 24 and 26 as the overhead product.

A first bottoms stream is removed from the fractional distillation column 11 through conduit means 31 and is provided to the reboiler 32. Steam is provided to the reboiler 32 through conduit means 34. A portion of the bottoms liquid flowing through conduit means 31 is recycled to the fractional distillation column 11 through conduit means 35. A second portion of the bottoms liquid flowing through conduit means 31 is removed from the reboiler 32 through conduit means 37 as the bottoms product stream.

As has been previously noted, the heating fluid flowing through conduit means 34 may be provided directly to the fractional distillation column in some fractional distillation processes. In these processes, there will generally be no recycling of the bottoms stream withdrawn through conduit means 31.

A second liquid stream is withdrawn from the fractional distillation column 11 through conduit means 41, passed through the waste heat exchanger 42 and returned to the fractional distillation column 11 through conduit means 44. A fluid stream which is hotter than the fluid stream flowing through conduit means 41 is provided to the waste heat exchanger 42 through conduit means 47.

The amount of heat provided by the waste heat stream will generally vary as a function of time. If the process from which the waste heat stream is provided should be shut down, the heat provided by the waste heat stream will be zero. Also, the heat provided by the waste heat stream may vary depending upon the loading on the process from which the waste heat stream is being provided. It is this variable heat input which is uncontrollable that provides the requirement for the control system of the present invention.

The level controller 51 is a conventional level controller which is operably connected to the fractional distillation column 11 by two sensors. The level controller 51 acts to maintain the liquid level in the fractional distillation column 11 between the two sensors. The sensors may be located very close together if a precise level is desired but generally will be located some distance apart since there is some freedom in the allowable liquid level in the fractional distillation column 11. Level controller 51 provides an output signal 52 the magnitude of which is dependent upon the liquid level in the fractional distillation column 11. The manner in which signal 52 varies will be described more fully hereinafter. Signal 52 is provided from the level controller 51 as a set point input to the flow controller 54 and may, depending upon the position of the three-way solenoid valve 56, be provided as the control signal 58 to the control valve 59 which is operably located in conduit means 25.

Flow transducer 61 in combination with the flow sensor 62, which is operably located in conduit means 34, provides an output signal 64 which is representative of the actual flow rate of the steam flowing through conduit means 34. Signal 64 is provided from the flow transducer 61 as the process variable input to the flow controller 54 and is also provided as an input to the pressure switch 66. In response to signals 52 and 64, the flow controller 54 provides an output signal 68 which is responsive to the difference between signals 52 and 64. Signal 68 is scaled so as to be representative of the position of the control valve 69, which is operably located in conduit means 34, required to maintain the magnitude of signal 64 substantially equal to the magnitude of signal 52. Signal 68 is provided from the flow controller 54 as a control signal to the control valve 69 and the control valve 69 is manipulated in response thereto.

Flow transducer 71 in combination with the flow sensor 72, which is operably located in conduit means 25, provides an output signal 74 which is representative of the actual flow rate of the external reflux flowing through conduit means 25. Signal 74 is provided from the flow transducer 71 as the process variable input to the flow controller 75. The flow controller 75 is also provided with a set point signal 77 which is representative of the desired flow rate of the external reflux flowing through conduit means 25. Signal 77 may be an operator entered value or may be a computer generated value which is representative of a flow rate of the external reflux which will maintain some process variable at a desired value.

In response to signals 74 and 77, the flow controller 75 provides an output signal 78 which is responsive to the difference between signals 74 and 77. Signal 78 is scaled so as to be representative of the position of the control valve 59 required to maintain the magnitude of signal 74 substantially equal to the magnitude of signal 77. Depending upon the position of the three-way solenoid valve 56, signal 78 may be provided as the control signal 58 to the control valve 59.

Pressure switch 66 is utilized to switch the solenoid valve 56. As will be more fully described hereinafter, pressure switch 66 is set so as to switch the solenoid valve 56 when the steam flow rate is zero. Thus, signal 78 will be provided as the control signal 58 when the steam flow rate is greater than zero and signal 52 will be provided as signal 58 when the steam flow rate is zero.

Pressure transducer 81 in combination with a pressure sensing device, which is operably located in conduit means 15, provides an output signal 82 which is representative of the actual pressure of the overhead vapor stream flowing through conduit means 15. Signal 82 is provided from the pressure transducer 81 as the process variable input to the pressure controller 84. The pressure controller 84 is also provided with a set point signal 86 which is representative of the desired pressure of the overhead vapor stream flowing through conduit means 15.

In response to signals 82 and 86, the pressure controller 84 provides an output signal 87 which is responsive to the difference between signals 82 and 86. Signal 87 is scaled so as to be representative of the flow rate of the overhead product stream required to maintain the actual pressure of the overhead vapor stream represented by signal 82 substantially equal to the desired pressure represented by signal 86. Signal 87 is provided from the pressure controller 84 as the set point input to the flow controller 88.

Flow transducer 91 in combination with the flow sensor 92, which is operably located in conduit means 26, provides an output signal 94 which is representative of the actual flow rate of the overhead product flowing through conduit means 26. Signal 94 is provided from the flow transducer 91 as the process variable input to the flow controller 88. In response to signals 87 and 94, the flow controller 88 provides an output signal 95 which is responsive to the difference between signals 87 and 94. Signal 95 is scaled so as to be representative of the position of the control valve 97, which is operably located in conduit means 26, required to maintain the actual flow rate of the overhead products substantially equal to the desired flow rate represented by signal 87. Essentially, the flow rate of the overhead product is utilized to maintain a desired pressure in the fractional distillation column 11.

Flow transducer 111 in combination with the flow sensor 112, which is operably located in conduit means 37, provides an output signal 114 which is representative of the actual flow rate of the bottoms product flowing through conduit means 37. Signal 114 is provided from the flow transducer 111 as the process variable input to the flow controller 116. The flow controller 116 is also provided with a set point signal 118 which is representative of the desired flow rate of the bottoms product stream. Again, signal 118 may be an operator entered value which will maintain a substantially constant flow rate of the bottoms product stream or may be a computer generated value which may be utilized to maintain a particular process variable at a desired value.

In response to signals 114 and 118, the flow controller 116 provides an output signal 121 which is responsive to the difference between signals 114 and 118. Signal 121 is scaled so as to be representative of the position of the control valve 122, which is operably located in conduit means 37, required to maintain the actual flow rate of the bottoms product stream substantially equal to the desired flow rate represented by signal 118. Signal 121 is provided from the flow controller 116 as a control signal to the control valve 122 and the control valve 122 is manipulated in response thereto.

As an illustration of the operation of the control system illustrated in FIG. 1, assume that the flow controller 54 will act to fully close control valve 69 when signal 52 is equal to 6 lbs and that control valve 59 is fully open when signal 58 is equal to 3 lbs and is 80% open when signal 58 is equal to 6 lbs. For a situation in which the waste heat stream cannot supply sufficient heat to the fractional distillation column, there will be some flow rate of steam through the reboiler 32 and thus signal 78 will be provided as signal 58 to the control valve 59. The output signal 52 from the level controller 51 will be directly manipulating the heat provided to the fractional distillation column 11 and thus signal 52 may be considered as being representative of the flow rate of steam through conduit means 34 required to maintain a desired liquid level in the fractional distillation column 11. The external reflux will be under control of the flow controller 75 and thus the flow rate of the external reflux should be substantially equal to the flow rate represented by signal 77.

Now consider a situation in which the amount of heat provided by the waste heat stream begins to increase. Assuming that flow controller 54 and control valve 69 are both direct acting control elements, the magnitude of signal 52 will be begin to decrease so as to cause the control valve 69 to become more fully closed which will result in a reduction of the steam flow rate to the reboiler 32. As this process continues, signal 52 may assume a value (6 lbs) which will cause the control valve 69 to become completely closed if sufficient heat is being supplied by the waste heat stream flowing through conduit means 47. If this situation occurs, the pressure switch 66 will cause the three-way solenoid valve 56 to switch and signal 52 will be provided as signal 58 to the control valve 59.

When the magnitude of signal 52 is such as to completely shut off the flow of steam, the liquid level in the fractional distillation column 11 will be lower than the desired value. When switched to control of the external reflux, the output signal 52 from the level controller 51 will essentially cause control valve 59 to go to an 80% open position. For this to occur, it is noted that it has been assumed that control valve 59 is reverse acting and control valve 69 is a direct acting control valve. If both control valves act in the same manner, then provision must be made to utilize a reversing relay to reverse signal 52 as it enters the three-way solenoid valve 56.

A substantial bump in the reflux flow rate may occur when the three-way solenoid valve 56 switches. However, the effect of the switch should be to add more reflux to build up the liquid level in the fractional distillation column 11.

If the uncontrolled heat input continues to increase, it is noted that control valve 59 can open more fully. The external reflux flow available should be sufficient to keep the fractional distillation column from going dry under any practical conditions and will generally be sufficient to build up the liquid level in the fractional distillation column.

As the liquid level in the fractional distillation column 11 begins to build up, the control signal 52 will cause the control valve 59 to begin to close to reduce the flow rate of the external reflux. If the liquid level continues to build up, a point will be reached in which signal 52 exceeds 6 lbs and causes control valve 69 to begin to open which will mean that control of the liquid level will be returned to control based on the heat input to the fractional distillation column 11 and the flow rate of the external reflux will be returned to the control under the flow controller 75.

The invention has been described in terms of a preferred embodiment as illustrated in FIG. 1. Specific components used in the practice of the invention as illustrated in FIG. 1 such as level controller 51; flow transducers 71, 91, 61, and 111; flow sensors 72, 92, 62 and 112; flow controllers 75, 88, 54 and 116; control valves 59, 97, 69 and 122; pressure switch 66; three-way solenoid valve 56; pressure transducer 81; and pressure controller 84 are each well known, commercially available control components such as are described at length in Perry's Chemical Engineers Handbook, 4th Ed, Chapter 22, McGraw-Hill.

For reasons of brevity, conventional auxiliary fractionation equipment such as pumps, other heat exchangers, additional measurement-controlled devices, etc. have not been included in the above description as they play no part in the explanation of the invention.

While the invention has been described in terms of the presently preferred embodiment, reasonable variations and modifications are possible by those skilled in the art, and such variations and modifications are within the scope of the described invention and the appended claims.

That which is claimed is:

1. Apparatus comprising:

a fractional distillation column;

means for passing a feed stream into said fractional distillation column;

means for withdrawing an overhead vapor stream from an upper portion of said fractional distillation column;

means for condensing at least a portion of said overhead vapor stream;

an accumulator;

means for passing the resulting at least partially condensed overhead stream into said accumulator;

means for withdrawing condensate from said accumulator, for passing a first portion of the thus withdrawn condensate into an upper portion of said fractional distillation column as an external reflux therefor and for passing a second portion of the thus withdrawn condensate as an overhead product stream;

means for withdrawing a bottoms product stream from a lower portion of said fractional distillation column;

means for supplying heat from a heating fluid stream to said fractional distillation column, wherein the heat supplied from said heating fluid stream is controllable;

means for supplying heat from a waste heat stream to said fractional distillation column, wherein the heat supplied from said waste heat stream is not controllable;

means for establishing a first signal which is responsive to the liquid level in the bottom of said fractional distillation column;

means for manipulating the heat supplied by said heating fluid stream in response to said first signal, if the amount of heat supplied by said waste heat stream to said fractional distillation column is not sufficient to supply all heat needed by said fractional distillation column, to thereby maintain a desired liquid level in the bottom of said fractional distillation column; and means for manipulating the flow rate of said external reflux in response to said first signal only if no heat is being supplied to said fractional distillation column by said heating fluid stream to thereby maintain a desired liquid level in the bottom of said fractional distillation column.

2. Apparatus in accordance with claim 1 wherein said first signal is scaled so as to be representative of the flow rate of said heating fluid stream required to maintain a desired liquid level in said fractional distillation column when the heat supplied by said heating fluid stream is being manipulated in response to said first signal and wherein said means for manipulating the heat supplied by said heating fluid stream in response to said first signal comprises:

a first control valve operably located so as to control the flow rate of said heating fluid stream;

means for establishing a second signal which is representative of the actual flow rate of said heating fluid stream;

means for comparing said first signal and said second signal and for establishing a third signal which is responsive to the difference between said first signal and said second signal, wherein said third signal is scaled so as to be representative of the position of said first control valve required to maintain the actual flow rate of said heating fluid stream substantially equal to the desired flow rate represented by said first signal; and means for manipulating said first control valve in response to said third signal.

3. Apparatus in accordance with claim 2 wherein said first signal is representative of the position of a second control valve, operably located so as to control the flow rate of said external reflux, required to maintain the actual liquid level in said fractional distillation column substantially equal to the desired liquid level when the flow rate of said external reflux is being manipulated in response to said first signal.

4. Apparatus in accordance with claim 3 additionally comprising:

means for establishing a fourth signal representative of the actual flow rate of said external reflux;

means for establishing a fifth signal representative of the desired flow rate of said external reflux;

means for comparing said fourth and said fifth signal and for establishing a sixth signal which is responsive to the difference between said fourth signal and said fifth signal, wherein said sixth signal is scaled so as to be representative of the position of said second control valve required to maintain the actual flow rate of said external reflux substantially equal to the desired flow rate represented by said fifth signal and wherein said second control valve is manipulated in response to said sixth signal only if some heat is being supplied from said heating fluid stream to said fractional distillation column.

5. Apparatus in accordance with claim 4 additionally comprising:

means for establishing a seventh signal representative of the actual pressure of said overhead vapor stream;

means for establishing an eighth signal representative of the desired pressure of said overhead vapor stream;

means for comparing said seventh and said eighth signal and for establishing a ninth signal which is responsive to the difference between said seventh and said eighth signal, wherein said ninth signal is scaled so as to be representative of the flow rate of said overhead product stream required to maintain the actual pressure of said overhead vapor stream substantially equal to the desired pressure represented by said eighth signal;

means for establishing a tenth signal representative of the actual flow rate of said overhead product stream;

a third control valve operably located so as to control the flow rate of said overhead product stream;

means for comparing said ninth signal and said tenth signal and for establishing an eleventh signal which is responsive to the difference between said ninth and said tenth signal, wherein said eleventh signal is scaled so as to be representative of the position of said third control valve required to maintain the actual flow rate of said overhead product stream substantially equal to the desired flow rate represented by said ninth signal;

means for establishing a twelfth signal representative of the actual flow rate of said bottoms product stream;

means for establishing a thirteenth signal representative of the desired flow rate of said bottoms product stream;

a fourth control valve operably located so as to control the flow rate of said bottoms product stream;

means for comparing said twelfth signal and said thirteenth signal and for establishing a fourteenth signal which is responsive to the difference between said twelfth signal and said thirteenth signal, wherein said fourteenth signal is scaled so as to be representative of the position of said fourth control valve required to maintain the actual flow rate of said bottoms product stream substantially equal to the desired flow rate represented by said thirteenth signal; and means for manipulating said fourth control valve in response to said fourteenth signal.

6. A method for controlling a fractional distillation process wherein an overhead vapor stream is removed from an upper portion of a fractional distillation column used in said fractional distillation process, wherein said overhead vapor stream is at least partially condensed with a first portion of the condensate being returned to an upper portion of said fractional distillation column as an external reflux and a second portion of said condensate being removed from said fractional distillation as an overhead product, wherein a bottoms product stream is withdrawn from a lower portion of said fractional distillation column, wherein heat is supplied from a heating fluid stream to said fractional distillation column, wherein the heat supplied from said heating fluid stream is controllable, wherein heat is supplied from a waste heat stream to said fractional distillation column and wherein the heat supplied from said waste heat stream is not controllable, said method comprising the steps of:

establishing a first signal which is responsive to the liquid level in the bottom of said fractional distillation column;

manipulating the heat supplied by said heating fluid stream in response to said first signal, if the amount of heat supplied by said waste heat stream to said fractional distillation column is not sufficient to supply all heat needed by said fractional distillation column, to thereby maintain a desired liquid level in the bottom of said fractional distillation column; and manipulating the flow rate of said external reflux in response to said first signal only if no heat is being supplied to said fractional distillation column by said heating fluid stream to thereby maintain a desired liquid level in the bottom of said fractional distillation column.

7. A method in accordance with claim 6 wherein said first signal is scaled so as to be representative of the flow rate of said heating fluid stream required to maintain a desired liquid level in said fractional distillation column when the heat supplied by said heating fluid stream is being manipulated in response to said first signal and wherein said step of manipulating the heat supplied by said heating fluid stream in response to said first signal comprises:

establishing a second signal which is representative of the actual flow rate of said heating fluid stream;

comparing said first signal and said second signal and establishing a third signal which is responsive to the difference between said first signal and said second signal, wherein said third signal is scaled so as to be representative of the position of a first control valve, which is operably located so as to control the flow rate of said heating fluid stream, required to maintain the actual flow rate of said heating fluid stream substantially equal to the desired flow rate represented by said first signal; and manipulating said first control valve in response to said third signal.

8. A method in accordance with claim 7 wherein said first signal is representative of the position of a second control valve, operably located so as to control the flow rate of said external reflux, required to maintain the actual liquid level in said fractional distillation column substantially equal to the desired liquid level when the flow rate of said external reflux is being manipulated in response to said first signal.

9. A method in accordance with claim 8 additionally comprising the steps of:

establishing a fourth signal representative of the actual flow rate of said external reflux;

establishing a fifth signal representative of the desired flow rate of said external reflux;

comparing said fourth and said fifth signal and establishing a sixth signal which is responsive to the difference between said fourth signal and said fifth signal, wherein said sixth signal is scaled so as to be representative of the position of said second control valve required to maintain the actual flow rate of said external reflux substantially equal to the desired flow rate represented by said fifth signal and wherein said second control valve is manipulated in response to said sixth signal only if some heat is being supplied from said heating fluid stream to said fractional distillation column.

10. A method in accordance with claim 9 additionally comprising the steps of:

establishing a seventh signal representative of the actual pressure of said overhead vapor stream;

establishing an eighth signal representative of the desired pressure of said overhead vapor stream;

comparing said seventh and said eighth signal and establishing a ninth signal which is responsive to the difference between said seventh and said eighth signal, wherein said ninth signal is scaled so as to be representative of the flow rate of said overhead product stream required to maintain the actual pressure of said overhead vapor stream substantially equal to the desired pressure represented by said eighth signal;

establishing a tenth signal representative of the actual flow rate of said overhead product stream;

comparing said ninth signal and said tenth signal and establishing an eleventh signal which is responsive to the difference between said ninth and said tenth signal, wherein said eleventh signal is scaled so as to be representative of the position of a third control valve, operably located so as to control the flow rate of said overhead product stream, required to maintain the actual flow rate of said overhead product stream substantially equal to the desired flow rate represented by said ninth signal;

establishing a twelfth signal representative of the actual flow rate of said bottoms product stream;

establishing a thirteenth signal representative of the desired flow rate of said bottoms product stream;

comparing said twelfth signal and said thirteenth signal and establishing a fourteenth signal which is responsive to the difference between said twelfth signal and said thirteenth signal, wherein said fourteenth signal is scaled so as to be representative of the position of a fourth control valve, operably located so as to control the flow rate of said bottoms product stream, required to maintain the actual flow rate of said bottoms product stream substantially equal to the desired flow rate represented by said thirteenth signal; and manipulating said fourth control valve in response to said fourteenth signal.

* * * * *